(12) United States Patent
Fujiwara

(10) Patent No.: US 8,039,552 B2
(45) Date of Patent: Oct. 18, 2011

(54) PROCESS FOR PRODUCING PROPYLENE BLOCK COPOLYMER

(75) Inventor: Yasuki Fujiwara, Ichikawa (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 305 days.

(21) Appl. No.: 12/493,296

(22) Filed: Jun. 29, 2009

(65) Prior Publication Data

US 2010/0004395 A1  Jan. 7, 2010

(30) Foreign Application Priority Data

Jul. 4, 2008 (JP) ................................. 2008-176268
Jul. 4, 2008 (JP) ................................. 2008-176270

(51) Int. Cl.
C08L 53/00 (2006.01)
C08F 4/00 (2006.01)
C08F 210/00 (2006.01)
C08F 110/06 (2006.01)

(52) U.S. Cl. ............. 525/88; 526/348; 526/351; 526/90

(58) Field of Classification Search ................... 525/88; 526/352, 348, 90
See application file for complete search history.

(56) References Cited

U.S. PATENT DOCUMENTS

| 5,134,209 | A | 7/1992 | Job et al. |
| 5,449,738 | A | 9/1995 | Koura et al. |
| 5,473,021 | A | 12/1995 | Koura et al. |

FOREIGN PATENT DOCUMENTS

| JP | 4634092 | B | 10/1971 |
| JP | 4741676 | B | 10/1972 |
| JP | 5236786 | B | 9/1977 |
| JP | 5239431 | B | 10/1977 |
| JP | 54148093 | A | 11/1979 |
| JP | 5552309 | A | 4/1980 |
| JP | 5523561 | B2 | 6/1980 |
| JP | 5724361 | B2 | 5/1982 |
| JP | 61181807 | A | 8/1986 |
| JP | 63142008 | A | 6/1988 |
| JP | 64006006 | A | 1/1989 |
| JP | 128049 | B2 | 5/1989 |
| JP | 343283 | B2 | 7/1991 |
| JP | 4227604 | A | 8/1992 |
| JP | 480044 | B2 | 12/1992 |
| JP | 58021405 | A | 2/1993 |
| JP | 5339319 | A | 12/1993 |
| JP | 6179720 | A | 6/1994 |
| JP | 7116252 | B2 | 12/1995 |
| JP | 8134124 | A | 5/1996 |
| JP | 9031119 | A | 2/1997 |
| JP | 11080234 | A | 3/1999 |
| JP | 11228628 | A | 8/1999 |
| JP | 11322833 | A | 11/1999 |
| JP | 3129458 | B2 | 1/2001 |
| JP | 3325419 | B2 | 9/2002 |
| JP | 2004182981 | A | 7/2004 |

*Primary Examiner* — William Cheung
(74) *Attorney, Agent, or Firm* — Panitch Schwarze Belisario & Nadel LLP

(57) ABSTRACT

A production process of a propylene block copolymer, comprising the step (I) of polymerizing propylene alone or a combination of propylene with an olefin other than propylene, in the presence of a defined polymerization catalyst, to form a polymer component (1), and the step (II) of copolymerizing propylene with an olefin other than propylene in the presence of the polymer component (1), to form a polymer component (2), wherein a combination of a transition metal compound such as $Zr(OR^1)_4$ and $Hf(OR^1)_4$ ($R^1$ being a hydrocarbon group) with an ether group-containing linear hydrocarbon compound and/or a Lewis base compound is added to the above polymerization system between the ending point of the step (I) and the starting point of the step (II), or during the step (II).

5 Claims, No Drawings

PROCESS FOR PRODUCING PROPYLENE BLOCK COPOLYMER

FIELD OF THE INVENTION

The present invention relates to a process for producing a propylene block copolymer.

BACKGROUND OF THE INVENTION

As an example of a production process of a propylene block copolymer having a good balance among its impact resistance, stiffness and workability, JP 3325419B discloses a production process comprising the steps of (1) homopolymerizing a predetermined amount of propylene or copolymerizing a predetermined amount of propylene with a predetermined amount of other olefin, thereby forming a slurry of the homopolymer or copolymer, (2) transferring the slurry to a reactor containing a combination of an ether or ester with a dialkylaluminum halide, and (3) further copolymerizing ethylene with propylene in the reactor.

SUMMARY OF THE INVENTION

However, propylene block copolymers produced according to the above production process are not necessarily sufficiently satisfactory in both their stiffness and their impact resistance.

In view of the above circumstances, the present invention has an object to provide a process for producing a propylene block copolymer excellent in both its stiffness and its impact resistance.

The present invention is a process for producing a propylene block copolymer, comprising the steps of:

(I) homopolymerizing propylene or copolymerizing propylene with an olefin other than propylene, in the presence of a catalyst formed by contacting with one another a solid catalyst component containing titanium atoms, magnesium atoms and halogen atoms, an organoaluminum compound and an external electron donor compound, thereby forming a polymer component (1) containing 90% by weight or more of propylene units, the total of the polymer component (1) being 100% by weight; and (II) copolymerizing propylene with an olefin other than propylene in the presence of the polymer component (1), thereby forming a polymer component (2) containing 10 to 90% by weight of propylene units, the total of the polymer component (2) being 100% by weight;

a combination of a transition metal compound represented by the following formula (ii) with an ether group-containing linear hydrocarbon compound and/or a Lewis base compound being added to the above polymerization system between the ending point of the step (I) and the starting point of the step (II), or during the step (II),

$$M(OR^1)_p X_q \qquad (ii)$$

wherein M is a zirconium atom or a hafnium atom; $R^1$ is a hydrocarbon group; X is a hydrogen atom, a halogen atom or a hydrocarbon group; p is a number satisfying $0 \leq p \leq m$; q is a number satisfying $0 \leq q \leq m$; $p+q=m$; and m is the valence of M.

The term "unit" as used in the above "propylene units" means a polymerized monomer unit such as a polymerized propylene unit.

Although a copolymer produced according to the production process of the present invention is referred to as a block copolymer, the copolymer is not a typical block copolymer containing a block chain such as -AAAAABBBBB-, wherein A and B are polymerization units of respective monomers, but is substantially a mixture of the polymer component (1) formed in the step (I) and the polymer component (2) formed in the step (II). Incidentally, copolymers produced according to such a production process comprising the multi-polymerization steps as the production process of the present invention are generally referred to as block copolymers by those skilled in the art.

DETAILED DESCRIPTION OF THE INVENTION

The solid catalyst component in the above step (I) may be known in the art. Examples of the solid catalyst component are those disclosed in patent documents such as JP 46-34092B, JP 47-41676B, JP 55-23561B, JP 57-24361B, JP 52-39431B, JP 52-36786B, JP 1-28049B, JP 3-43283B, JP 4-80044A, JP 55-52309A, JP 58-21405A, JP 61-181807A, JP 63-142008A, JP 5-339319A, JP 54-148093A, JP 4-227604A, JP 6-2933A, JP 64-6006A, JP 6-179720A, JP 7-116252B, JP 8-134124A, JP 9-31119A, JP 11-228628A, JP 11-80234A, JP 11-322833A and JP 2004-182981A.

The solid catalyst component contains preferably an internal electron donor compound besides titanium atoms, magnesium atoms and halogen atoms. The internal electron donor compound is preferably organic acid eaters or ethers mentioned hereinafter.

Examples of a method for producing the solid catalyst component are the following methods (1) to (5) known in the art, and the method (5) is preferable among them:

(1) a method comprising the step of contacting a halogenated magnesium compound with a titanium compound;

(2) a method comprising the step of contacting a halogenated magnesium compound, a titanium compound and an internal electron donor compound with one another;

(3) a method comprising the steps of dissolving a halogenated magnesium compound and a titanium compound in an electron donor solvent, thereby obtaining a solution, and then impregnating a carrier material with the solution;

(4) a method comprising the step of contacting a dialkoxymagnesium compound, a halogenated titanium compound and an internal electron donor compound with one another; and (5) a method comprising the step of contacting a solid component containing magnesium atoms, titanium atoms and hydrocarbyloxy groups, a halogenating compound and an internal electron donor compound and/or organic acid halide.

In order to improve stiffness of a propylene block copolymer, the solid catalyst component is preferably produced according to a process known in the art, comprising the steps of:

(1) reducing a titanium compound represented by the following formula (i), which contains tetravalent titanium atoms, with an organomagnesium compound in the presence of an organosilicon compound containing a Si—O bond, thereby reducing substantially all the tetravalent titanium atoms to trivalent titanium atoms, and forming a solid component containing trivalent titanium atoms; and (2) contacting the solid component, a halogenating compound and an internal electron donor compound with one another;

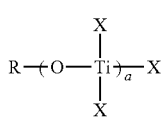

(i)

wherein R is a hydrocarbon group having 1 to 20 carbon atoms; X is independently of one another a halogen atom or a hydrocarbyloxy group having 1 to 20 carbon atoms; and a is a number of 1 to 20.

Examples of the organosilicon compound containing a Si—O bond are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Examples of the organomagnesium compound are methylmagnesium chloride, ethylmagnesium chloride, propylmagnesium chloride, isopropylmagnesium chloride, butylmagnesium chloride, sec-butylmagnesium chloride, tert-butylmagnesium chloride, isoamylmagnesium chloride, hexylmagnesium chloride, octylmagnesium chloride, 2-ethylhexylmagnesium chloride, phenylmagnesium chloride, and benzylmagnesium chloride.

Examples of the halogenating compound are titanium tetrahalides (for example, titanium tetrachloride, titanium tetrabromide and titanium tetraiodide), alkoxytitanium trihalides (for example, methoxytitanium trichloride, ethoxytitanium trichloride, butoxytitanium trichloride, phenoxytitanium trichloride and ethoxytitanium tribromide), dialkoxytitanium dihalides (for example, dimethoxytitanium dichloride, diethoxytitanium dichloride, dibutoxytitanium dichloride, diphenoxytitanium dichloride and diethoxytitanium dibromide), trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, diisobutyldichlorotin, diphenyldichlorotin, divinyldichlorotin, methyltrichlorotin, phenyltrichlorotin, dichlorolead, methylchlorolead and phenylchlorolead.

Examples of the internal electron donor compound are phthalic acid; phthalic acid derivatives such as monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, diisoheptyl phthalate, di-n-octyl phthalate, di(2-ethylhexyl)phthalate, di-n-decyl phthalate, diisodecyl phthalate, dicyclohexyl phthalate, diphenyl phthalate, and phthalic dichloride; 1,3-diethers such as 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2-isopropyl-2-isopentyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-n-heptyl-2-isopentyl-1,3-dimethoxypropane, 2-isopropyl-2-isobutyl-1,3-dimethoxypropane, 2-isopropyl-2-isopentyl-1,3-dimethoxypropane, 2,2-diisobutyl-1,3-dimethoxypropane, 2-diisopropyl-1,3-dimethoxypropane, and 2-dicyclohexyl-1,3-dimethoxypropane; and dialkyl ethers such as dimethyl ether, diethyl ether, di-n-propyl ether, diisopropyl ether, di-n-butyl ether, diisobutyl ether, di-n-amyl ether, diisoamyl ether, methyl ethyl ether, methyl n-butyl ether, and methyl cyclohexyl ether.

The organoaluminum compound means a compound having one or more aluminum-carbon bonds in its molecule. Examples thereof are compounds represented by the following respective formulas:

$$R_w^2 AlY_{3-w}, \text{ and}$$

$$R^3R^4Al—O—AlR^5R^6,$$

wherein $R^2$ to $R^6$ are independently of one another a hydrocarbon group having 1 to 20 carbon atoms; Y is a halogen atom, a hydrogen atom or an alkoxy group; and w is a number satisfying $2 \leq w \leq 3$.

Examples of the organoaluminum compound represented by the above formulas are trialkylaluminums such as triethylaluminum, triisobutylaluminum and trihexylaluminum; dialkylaluminum hydrides such as diethylaluminum hydride and diisobutylaluminum hydride; dialkylaluminum halides such as diethylaluminum chloride; mixtures of trialkylaluminums with dialkylaluminum halides such as a mixture of triethylaluminum with diethylaluminum chloride; and alkylalumoxanes such as tetraethyldialumoxane and tetrabutyldialumoxane. Among them, preferred are trialkylaluminums, mixtures of trialkylaluminums with dialkylaluminum halides, or alkylalumoxanes; and particularly preferred is triethylaluminum, triisobutylaluminum, a mixture of triethylaluminum with diethylaluminum chloride, or tetraethyldialumoxane, from a viewpoint of an activity of a polymerization catalyst and stereoregularity of the polymer component (1).

The external electron donor compound means a compound containing an electron-donating element. Examples thereof are oxygen-containing compounds, nitrogen-containing compounds, phosphorus-containing compounds and sulfur-containing compounds. Among them, preferred are oxygen-containing compounds or nitrogen-containing compounds, and particularly preferred are oxygen-containing compounds. Use of the external electron donor compound enables an efficient production of a propylene block copolymer, which contains the polymer component (1) having a high stereoregularity.

Examples of the above oxygen-containing compounds are alkoxysilicon compounds, ethers, esters and ketones. Among them, preferred are alkoxysilicon compounds or ethers, from a viewpoint of an activity of a polymerization catalyst and stereoregularity of the polymer component (1).

Examples of the above alkoxysilicon compounds are compounds represented by the following formula:

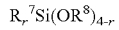

$$R_r^7Si(OR^8)_{4-r}$$

wherein $R^7$ is a hydrocarbon group having 1 to 20 carbon atoms, a hydrogen atom, or a hetero atom-containing group, and all $R^7$s are the same as, or different from one another; $R^8$ is a hydrocarbon group having 1 to 20 carbon atoms, and all $R^8$s are the same as, or different from one another; and r is a number satisfying $0 \leq r \leq 4$.

Examples of the above hydrocarbon group having 1 to 20 carbon atoms of $R^7$ or $R^8$ are linear alkyl groups such as a methyl group, an ethyl group, a propyl group, a butyl group and a pentyl group; branched-chain alkyl groups such as an isopropyl group, a sec-butyl group, a tert-butyl group and a tert-amyl group; cycloalkyl groups such as a cyclopentyl group and a cyclohexyl group; cycloalkenyl groups such as a cyclopentenyl group; and aryl groups such as a pheny group and a tolyl group. When $R^7$ is a hydrocarbon group having 1 to 20 carbon atoms, the alkoxysilicon compounds represented by the above formula preferably have one or more $R^7$s, whose carbon atoms directly linked to the silicon atom are a secondary or tertiary carbon atom.

Examples of the hetero atom contained in the above hetero atom-containing group of $R^7$ are an oxygen atom, a nitrogen atom, a sulfur atom and a phosphorus atom. Examples of the hetero atom-containing group are a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group and a thienyl group. When $R^7$ is a hetero atom-containing group, the alkoxysilicon compounds represented by the above formula are preferably alkoxysilicon compounds represented by the following formula:

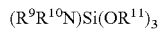

$$(R^9R^{10}N)Si(OR^{11})_3$$

wherein $R^9$ is a hydrocarbon group having 1 to 12 carbon atoms; $R^{10}$ is a hydrocarbon group having 1 to 12 carbon atoms, or a hydrogen atom; and $R^{11}$ is a hydrocarbon group having 1 to 6 carbon atoms.

Examples of the alkoxysilicons compound represented by this formula are diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicylohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, dimethylaminotriethoxysilane, diethylaminotriethoxysilane, diethylaminotrimethoxysilane, diethylaminotri-n-propoxysilane, di-n-propylaminotriethoxysilane, methyl-n-propylaminotriethoxysilane, tert-butylaminotriethoxysilane, ethyl-n-propylaminotriethoxysilane, ethylisopropylaminotriethoxysilane, and methylethylaminotriethoxysilane.

Examples of the ethers of the above oxygen-containing compounds are dialkyl ethers, diethers represented by the following formula and cyclic ethers, and combinations of two or more of those ethers:

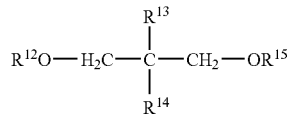

$$R^{12}O-H_2C-\underset{\underset{R^{14}}{|}}{\overset{\overset{R^{13}}{|}}{C}}-CH_2-OR^{15}$$

wherein $R^{12}$ and $R^{15}$ are independently of each other a $C_{1-20}$ linear, branched or alicyclic alkyl group, aryl group or aralkyl group; and $R^{13}$ and $R^{14}$ are independently of each other a $C_{1-20}$ linear, branched or alicyclic alkyl group, aryl group or aralkyl group, or a hydrogen atom.

Examples of the ethers are dimethyl ether, diethyl ether, di-n-butyl ether, methyl ethyl ether, methyl n-butyl ether, methyl cyclohexyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, and 2-heptyl-2-pentyl-1,3-dimethoxypropane.

The above cyclic ether means a heterocyclic compound containing one or more —C—O—C— bonds in its ring system. Examples of the cyclic ether are ethylene oxide, propylene oxide, trimethylene oxide, tetrahydrofuran, 2,5-dimethoxytetrahydrofuran, tetrahydropyrane, hexamethylene oxide, 1,3-dioxepane, 1,3-dioxane, 1,4-dioxane, 1,3-dioxolane, 2-methyl-1,3-dioxolane, 2,2-dimethyl-1,3-dioxolane, 4-methyl-1,3-dioxolane, 2,4-dimethyl-1,3-dioxolane, furan, 2,5-dimethylfuran and s-trioxane.

Examples of the nitrogen-containing compounds of the above external electron donor compound are 2,6-substituted piperidines such as 2,6-dimethylpiperidine and 2,2,6,6-tetramethylpiperidine; substituted methylene diamines such as 2,5-substituted piperidines, N,N,N',N'-tetramethylmethylene diamine and N,N,N',N'-tetraethylmethylene diamine; and substituted imidazolidines such as 1,3-dibenzylimidazolidine.

Examples of the phosphorous-containing compounds of the above external electron donor compound are phosphonic esters such as dimethyl phenylphosphonate and diethyl phenylphosphonate; and phosphinic esters such as dimethoxyphenylphosphine, methoxydiphenylphosphine, diethoxyphenylphosphine, and ethoxydiphenylphosphine.

Examples of the sulfur-containing compounds of the above external electron donor compound are thiophenes such as thiophene, 2,5-dimethylthiophene, 2,5-diethylthiophene, tetrahydrothiophene, 2,5-dimethyltetrahydrothiophene, and 2,5-diethyltetrahydrothiophene.

There are no particular limitations in a method for contacting the solid catalyst component, organoaluminum compound and external electron donor compound with one another, in order to form a polymerization catalyst in the present invention. Examples of the method are the following (1) to (3):

(1) mixing the solid catalyst component, organoaluminum compound and external electron donor compound with one another, and then feeding the resultant mixture to the step (I);

(2) separately feeding the solid catalyst component, organoaluminum compound and external electron donor compound to the step (I), thereby contacting them with one another; and (3) mixing a part of the solid catalyst component, organoaluminum compound and external electron donor compound with one another, and then separately feeding the resultant mixture and the remaining part thereof to the step (I).

Each of the solid catalyst component, organoaluminum compound and external electron donor compound used for the above contact may be combined with a solvent.

The above feeding to the step (I) is carried out generally in an atmosphere of an inert gas such as nitrogen and argon, and in a water-free state.

In order to produce propylene block copolymers having a good powder property, the solid catalyst component used in the step (I) is preferably a pre-polymerized solid catalyst component, as produced below. The pre-polymerized solid catalyst component can be produced by polymerizing a small amount of an olefin in the presence of the above-mentioned solid catalyst component and organoaluminum compound, wherein (i) the olefin is the same as or different from the olefin used in the step (I) or (II) in its type, and (ii) a chain-transfer agent such as hydrogen or the above-mentioned external electron donor compound may be used to regulate a molecular weight of the resultant olefin polymer. The above polymerization is generally referred to as a "pre-polymerization" in contrast to the "main polymerization" in the steps (I) and (II), and the pre-polymerized solid catalyst component is, in other words, a modified solid catalyst component, whose surface is covered by the resultant olefin polymer.

In the present invention, the term "solid catalyst component" means not only the above-mentioned unmodified solid catalyst component, but also pre-polymerized solid catalyst component.

The pre-polymerization is preferably a slurry polymerization in an inert hydrocarbon solvent such as propane, butane, isobutane, pentane, isopentane, hexane, heptane, octane, cyclohexane, benzene and toluene. A partial or total amount of the inert hydrocarbon solvent may be replaced with a liquid olefin, which is not pre-polymerized.

The organoaluminum compound in the pre-polymerization is used in an amount of generally 0.5 to 700 moles, preferably 0.8 to 500 moles, and particularly preferably 1 to 200 moles, per one mol of titanium atoms contained in the solid catalyst component used in the pre-polymerization.

An amount of the olefin pre-polymerized in the pre-polymerization is generally 0.01 to 1,000 g, preferably 0.05 to 500 g, and particularly preferably 0.1 to 200 g, per one gram of the solid catalyst component used in the pre-polymerization.

The pre-polymerization is preferably a slurry polymerization, and the slurry concentration of the solid catalyst component is preferably 1 to 500 g—solid catalyst component/liter-solvent, and particularly preferably 3 to 300 g—solid catalyst component/liter-solvent.

The pre-polymerization is carried out at preferably −20 to 100° C., and particularly preferably 0 to 80° C., and under a partial pressure of an olefin in a gas phase of preferably 0.01 to 2 MPa, and particularly preferably 0.1 to 1 MPa, provided, however, that an olefin in a liquid state under a pre-polymerization temperature and a pre-polymerization pressure is not limited thereto. A pre-polymerization time is not particularly limited, and is preferably 2 minutes to 15 hours.

Examples of a method for feeding the solid catalyst component, the organoaluminum compound and an olefin to a pre-polymerization reactor are the following methods (1) and (2):

(1) a method comprising the steps of feeding the solid catalyst component and the organoaluminum compound, and then feeding an olefin; and (2) a method comprising the steps of feeding the solid catalyst component and an olefin, and then feeding the organoaluminum compound.

Examples of a method for feeding an olefin to a pre-polymerization reactor are the following methods (1) and (2):

(1) a method of sequentially feeding an olefin to the pre-polymerization reactor, so as to keep an inner pressure of the pre-polymerization reactor at a predetermined level; and (2) a method of feeding a predetermined total amount of an olefin, at a time, to the pre-polymerization reactor.

The external electron donor compound in the pre-polymerization is optionally used in an amount of generally 0.01 to 400 mol, preferably 0.02 to 200 mol, and particularly preferably 0.03 to 100 mol, per one mol of titanium atoms containing in the solid catalyst component used in the pre-polymerization, and is used in an amount of generally 0.003 to 5 mol, preferably 0.005 to 3 mol, and particularly preferably 0.01 to 2 mol, per one mol of the organoaluminum compound used in the pre-polymerization.

Examples of a method for feeding the external electron donor compound to a polymerization reactor in the pre-polymerization are the following methods (1) and (2):

(1) a method of feeding independently the external electron donor compound to a polymerization reactor; and (2) a method of feeding a contact product of the external electron donor compound with the organoaluminum compound to a polymerization reactor.

The above step (I) is carried out in the presence of the polymerization catalyst formed according to any of the above methods, optionally using a chain transfer agent such as hydrogen to regulate a molecular weight of the polymer component (1). In order to improve properties such as stiffness of the propylene block copolymer produced, the polymer component (1) contains propylene units in an amount of 90% by weight or more, preferably 95% by weight or more, and particularly preferably 100% by weight, the total of the polymer component (1) being 100% by weight. Examples of the olefin other than propylene used in the step (I) and the step (II) mentioned hereinafter are ethylene and α-olefins having 4 to 10 carbon atoms.

From a viewpoint of stiffness of the propylene block copolymer produced, the polymer component (1) has a melting temperature (Tm) of preferably 160° C. or higher, measured with a differential scanning calorimeter (DSC).

The step (II) is a step of further polymerizing propylene with an olefin other than propylene, in the presence of the polymer component (1), optionally using a chain transfer agent such as hydrogen to regulate a molecular weight of the polymer component (2), to form the polymer component (2), thereby obtaining the propylene block copolymer containing the polymer components (1) and (2). In order to improve properties such as impact resistance of the propylene block copolymer produced, the polymer component (2) contains propylene units in an amount of 10 to 90% by weight, and preferably 30 to 70% by weight, the total of the polymer component (2) being 100% by weight. In order to improve properties such as impact resistance of the propylene block copolymer produced, the propylene block copolymer contains the polymer component (2) in an amount of preferably 10 to 50% by weight, and more preferably 15 to 40% by weight, the total of the propylene block copolymer being 100% by weight.

The polymer component (2) has an intrinsic viscosity ([η]) of preferably 0.1 to 10 dl/g, more preferably 1 to 8 dl/g, and further preferably 2 to 6 dl/g, measured at 135° C. in Tetraline.

The organoaluminum compound in the step (I) is used in an amount of usually 1 to 1,000 mol, and preferably 5 to 600 mol, per one mol of titanium atoms contained in the solid catalyst component used in the step (I).

The external electron donor compound in the step (I) is used in an amount of usually 0.1 to 2,000 mol, preferably 0.3 to 1,000 mol, and particularly preferably 0.5 to 800 mol, per one mol of titanium atoms contained in the solid catalyst component used in the step (I), and in an amount of usually 0.001 to 5 mol, preferably 0.005 to 3 mol, and particularly preferably 0.01 to 1 mol, per one mol of the organoaluminum compound used in the step (I).

The steps (I) and (II) are carried out at a polymerization temperature of usually −30 to 300° C., preferably 20 to 180° C., and more preferably 50 to 95° C., under an unlimited polymerization pressure, however, from an industrial and economical point of view, under usually an atmospheric pressure to 10 Ma, and preferably 0.2 to 5 MPa; and are carried out in a batch-wise or continuous polymerization type. Examples of the polymerization method in the steps (I) and (II) are (1) a slurry polymerization method using an inert hydrocarbon solvent such as propane, butane, isobutane, pentane, hexane, heptane and octane, (2) a solution polymerization method using those inert hydrocarbon solvents, (3) a bulk polymerization method using a medium of an olefin, which is liquid at a polymerization temperature, and (4) a gas-phase polymerization method. The step (II) is carried out preferably according to a gas-phase polymerization method, in order to produce the propylene block copolymer having a good powder property.

In the present invention, a combination of a transition metal compound represented by the above formula (II) with an ether group-containing linear hydrocarbon compound and/or a Lewis base compound is added to the polymerization system between the ending point of the step (I) and the starting point of the step (II), or during the step (II), thereby obtaining the propylene block copolymer excellent in both its stiffness and its impact resistance. The above combination means the following three cases (i) to (iii):

(i) a combination of the transition metal compound with the ether group-containing linear hydrocarbon compound;

(ii) a combination of the transition metal compound with the Lewis base compound; and (iii) a combination of the transition metal compound with the ether group-containing linear hydrocarbon compound and Lewis base compound.

The hydrocarbon group of $R^1$ and X in the formula (ii) is preferably hydrocarbon groups having 1 to 20 carbon atoms, and more preferably hydrocarbon groups having 3 to 6. Examples of $R^1$ and X are linear alkyl groups such as a methyl group, an ethyl group, a propyl group, a butyl group and a pentyl group; branched-chain alkyl groups such as an isopropyl group, an isobutyl group, a sec-butyl group, a tert-butyl group and a tert-amyl group; cycloalkyl groups such as a cyclopentyl group and a cyclohexyl group; cycloalkenyl groups such as a cyclopentenyl group; and aryl groups such as a pheny group and a tolyl group. Among them, preferred is a propyl group, an isopropyl group, a butyl group, an isobutyl group, or a sec-butyl group, from a viewpoint of a polymerization catalyst activity.

Examples of the halogen atom of X in the formula (ii) are a fluorine atom, a chlorine atom, a bromine atom and an iodine atom. Among them, a chlorine atom is preferable in order to improve impact resistance of the propylene block copolymer.

In order to further improve impact resistance of the propylene block copolymer, the transition metal compound is preferably a compound represented by the formula $Zr(OR^1)_4$ or $Hf(OR^1)_4$. Examples of the transition metal compound are zirconium ethoxide, zirconium n-propoxide, zirconium isopropoxide, zirconium 2-methoxymethyl-2-propoxide, zirconium n-butoxide, zirconium isobutoxide, zirconium tert-butoxide, zirconium 2-methyl-2-butoxide, zirconium 2-ethylhexoxide, hafnium ethoxide, hafnium n-propoxide, hafnium isopropoxide, hafnium 2-methoxymethyl-2-propoxide, hafnium n-butoxide, hafnium isobutoxide, hafnium tert-butoxide, hafnium 2-methyl-2-butoxide, and hafnium 2-ethylhexoxide.

Examples of the ether group-containing linear hydrocarbon compound are 1,2-dimethoxyethane, 1,2-diethoxyethane, 1,2-dimethoxypropane, 1,1,2-trimethoxyethane, 2-methoxyethoxymethyl chloride, 1,2-bis(2-chloroethoxy)ethane, dibutyl ether, butyl ethyl ether, dipropyl ether, 2-amino-1-methoxybutane, 3-methoxypropylamine, N-(2-methoxyethyl)methylamine, and N-(2-methoxyethyl)ethylamine. Among them, preferred is 1,2-dimethoxyethane, 1,2-diethoxyethane, 2-methoxyethoxymethyl chloride, 1,2-bis(2-chloroethoxy)ethane, 2-amino-1-methoxybutane, 3-methoxypropylamine, N-(2-methoxyethyl)methylamine, or N-(2-methoxyethyl)ethylamine, from a viewpoint of properties such as impact resistance of the propylene block copolymer.

The above Lewis base compound means a compound containing an electron-donating group or an electron-donating atom. Examples of the electron-donating group are an alkoxy group, an ether group, an ester group, a ketone group, an amino group, an amide group, an imide group, and a nitrile group. Examples of the electron-donating atom are a nitrogen atom and an oxygen atom. The Lewis base compound is preferably nitrogen atom-containing heterocyclic compounds or alkoxy group-containing aromatic compounds, in order to improve impact resistance of the propylene block copolymer.

The above nitrogen atom-containing heterocyclic compounds are preferably 3 to 8-membered cyclic nitrogen atom-containing organic compounds such as pyridine, pyridine derivatives, piperidine, piperidine derivatives, pyrrolidine, and pyrrolidine derivatives; more preferably nitrogen atom-containing heterocyclic aromatic compounds, whose nitrogen atom-containing heterocyclic structure is a 6-membered cyclic structure; and further preferably 6-membered nitrogen atom-containing heterocyclic aromatic compounds having 2,6-positioned substituent groups. Specific examples thereof are 2,6-lutidine, 2,6-diethylpyridine, 2,6-dipropylpyridine, 2,6-diisopropylpyridine, 2,6-dimethoxypyridine, 2,6-diethoxypyridine, 2,6-dipropoxypyridine, 2,6-diisopropoxypyridine, 2,6-di-n-butoxypyridine, 2,6-di-tert-butoxypyridine, 2,6-dibenzyloxypyridine, 2,4,6-tribenzyloxypyridine, 2,6-diphenoxypyridine, 2,6-diacetoxypyridine, 2,6-difluoropyridine, 2,4,6-trifluoropyridine, 2,6-dichloropyridine, and 2,4,6-trichloropyridine.

Examples of the above alkoxy group-containing aromatic compounds are 1,2-dimethoxybenzene, 1,2-diethoxybenzene, phenetol, 2-ethoxyanisol, 1,2-diethoxy-3-methylbenzene, 1,2-diethoxy-3-ethylbenzene, 1,2-diethoxy-3-fluorobenzene, 1,2-diethoxy-3-chlorobenzene, 1,2-diethoxy-3-methoxybenzene, 1,2,3-triethoxybenzene, 1,2-diethoxy-4-methylbenzene, 1,2-diethoxy-4-ethylbenzene, 1,2,4-triethoxybenzene, 1,2-diethoxy-4-fluorobenzene, and 1,2-diethoxy-4-chlorobenzene. Among them, preferred is 2,6-lutidine or 1,2-diethoxybenzene, in order to improve impact resistance of the propylene block copolymer.

A combination of the transition metal compound with the ether group-containing linear hydrocarbon compound and/or Lewis base compound is added to the polymerization system, preferably at the same time or in this order, batch-wise or continuously, as it is or diluting with a dilution agent such as inert hydrocarbon solvents.

The above combination is added to the polymerization system between the ending point of the step (I) and the starting point of the step (II), or during the step (II). Among them, the combination of the transition metal compound with the ether group-containing linear hydrocarbon compound and/or Lewis base compound is added thereto preferably in this order, between the ending point of the step (I) and the starting point of the step (II), in order to further improve impact resistance of the propylene block copolymer.

The present inventor supposes the reason why the propylene block copolymer produced according to the production process of the present invention is excellent in both its stiffness and its impact resistance, as follows:

Generally, stiffness of a propylene block copolymer is largely determined by such main factors as (i) a copolymerization ratio of propylene to an olefin other than propylene, (ii) a melting temperature of the polymer component (1), and (iii) a ratio of the polymer component (1) to the polymer component (2). When stiffness is increased by chaining those factors, impact resistance is usually decreased. In the present invention, however, the external electron donor compound used in the step (I) is replaced by the ether group-containing linear hydrocarbon compound and/or Lewis base compound, by means of adding to the polymerization system, the combination of the transition metal compound (Lewis acid) represented by the formula (ii) with the ether group-containing linear hydrocarbon compound and/or Lewis base compound, between the ending point of the step (I) and the starting point of the step (II), or during the step (II), thereby forming the polymer component (2) having a preferred structure and a small particle diameter, which results in production of a propylene block copolymer excellent in its impact resistance.

The present invention enables production of a propylene block copolymer excellent in both its stiffness and its impact resistance, because its impact resistance can be increased without changing the above factors predetermined in view of its stiffness.

The transition metal compound is used in an amount of usually 0.001 to 10 mol, and preferably 0.01 to 1 mol, per one mol of titanium atoms contained in the solid catalyst component used in the step (I), in order to improve impact resistance of the propylene block copolymer.

In order to improve impact resistance of the propylene block copolymer, the ether group-containing linear hydrocarbon compound or the Lewis base compound is used in an amount of usually 0.001 to 10 mol, preferably 0.01 to 5 mol, and particularly preferably 0.01 to 1 mol, per one mol of titanium atoms contained in the solid catalyst component used in the step (I), and in an amount of usually 0.1 to 50 mol, and preferably 0.5 to 20 mol, per one mol of the transition metal compound.

According to the present invention, there can be produced a propylene block copolymer excellent in both its stiffness and its impact resistance, which is widely applicable to molded materials such as interior or exterior materials for cars, and cases for electrical parts.

EXAMPLE

The present invention is explained in more detail with reference to the following Examples, which do not limit the present invention.

Example 1

Step (I)

A 3-liter inner volume stainless-steel autoclave equipped with a stirrer was dried under reduced pressure, and then was purged with argon gas. The autoclave was cooled, and then was evacuated. There were put in a glass charger 50 mL of heptane, 4.4 mmol of triethylaluminum (organoaluminum compound), 0.44 mmol of tert-butyl-n-propyldimethoxysilane (external electron donor compound), and 11.5 mg of a solid catalyst component disclosed in Example 1 (2) of JP 2004-182981A, in this order, thereby contacting them.

The resultant contact product was put all together to the above autoclave. Then, 780 g of liquid propylene and 1 MPa of hydrogen were supplied to the autoclave, in this order. The autoclave was heated up to 80° C., thereby initiating polymerization of propylene.

Ten minutes after the initiation of polymerization, unreacted propylene monomer was purged out of the autoclave. The autoclave was purged with argon, and then the produced polymer component (1) was sampled. The polymer component (1) was found to have an intrinsic viscosity ([η]P) of 0.94 dl/g, 0.7% by weight of a 20° C. xylene-soluble part (CXS), the total of the polymer component (1) being 100% by weight, and a melting temperature (Tm) of 161.2° C. The above 0.94 dl/g was slightly different from 0.97 d/g in Table 1, because the latter was an average of two intrinsic viscosity values of the polymer component (1) prepared in two batches.

Addition of Compounds

The above autoclave was depressurized. There were mixed 0.15 mmol of zirconium (IV) isopropoxide (Zr(O-iPr)$_4$/transition metal compound) and 20 mL of heptane in a glass charger, and the resultant mixture was supplied to the above depressurized autoclave. The autoclave was stirred for 30 minutes. Further, 0.22 mmol of 1,2-dimethoxyethane (ether group-containing linear hydrocarbon compound) and 20 mL of heptane were mixed in a glass charger. The resultant mixture was similarly supplied to the above autoclave, and the autoclave was stirred for 30 minutes.

Step (II)

A 24-liter inner volume cylinder connected to the above autoclave was evacuated. The cylinder was charged with 380 g of propylene and 110 g of ethylene, and then was heated up to 80° C., thereby preparing a mixed gas of propylene with ethylene, wherein the molar ratio of ethylene to propylene charged was 0.43.

The mixed gas in the cylinder was fed continuously to the above autoclave, thereby copolymerizing propylene with ethylene in the autoclave for four hours under a polymerization pressure of 0.8 MPa. All gases in the autoclave were purged, and the resultant polymer was dried at 60° C. for five hours under reduced pressure, thereby obtaining 242 g of polymer powder (propylene block copolymer).

The propylene block copolymer was found to have an intrinsic viscosity ($[\eta]T$) of 1.91 dl/g, a melt flow rate (MFR) of 18.4 g/10 minutes, tensile strength of 26.3 MPa, flexural strength of 944 MPa, and IZOD impact strength of 17.8 kJ/m$^2$ (23° C.) and 4.3 kJ/m$^2$ (−30° C.). An article molded from the propylene block copolymer was found to contain dispersed particles of the polymer component (2) in the number of 1.55 particles/μm$^2$, and the dispersed particles had a volume-average particle diameter (Dv) of 0.29 μm, providing the dispersed particles had a round shape. The polymer component (2) was found to contain 46% by weight of ethylene units, the total of the polymer component (2) being 100% by weight. The content (X) of the polymer component (2) (propylene-ethylene copolymer) in the propylene block copolymer was found to be 16.6% by weight, based on which an intrinsic viscosity ($[\eta]EP$) of the polymer component (2) was calculated to be 5.77 dl/g. Results are shown in Tables 1 to 3. The above 46% by weight, 16.6% by weight and 5.77 dl/g were slightly different from 42% by weight, 17% by weight and 5.81 dl/g in Table 1, respectively, because the latter values were an average of respective two values of the polymer component (2) prepared in two batches.

The above intrinsic viscosities, $[\eta]P$ and $[\eta]T$, were measured according to the following method comprising the steps of:

(1) measuring respective reduced viscosities of TETRA-LINE solutions having concentrations of 0.1 g/dl, 0.2 g/dl and 0.5 g/dl, at 135° C. with an Ubbellohde viscometer; and (2) calculating an intrinsic viscosity according to a method described in "Kobunshi yoeki, Kobunshi jikkengaku 11" (published by Kyoritsu Shuppan Co. Ltd. in 1982), page 491, namely, by plotting those reduced viscosities for those concentrations, and then extrapolating the concentration to zero; and the above intrinsic viscosity, $[\eta]EP$, was calculated from the formula, $[\eta]EP=[\eta]T/X-(1/X-1)[\eta]P$, wherein X is the content of the polymer component (2) in the propylene block copolymer, as mentioned above.

The above 20° C. xylene-soluble part (CXS), namely, the amount of soluble parts in xylene at 20° C., was measured according to a method comprising the steps of:

(1) adding 200 mL of xylene to 1 g of the polymer component (1);

(2) boiling the mixture to dissolve all of the polymer component (1);
cooling the solution;
keeping the solution at 20° C. for 1 hour or more;
separating soluble parts and insoluble parts with each other with a filter paper;
distilling the solvent contained in the filtrate away to dryness, thereby obtaining soluble parts;
weighing the soluble parts, and
calculating the amount (CXS) based thereon.

The above melting temperature (Tm) was measured with a differential scanning calorimeter DSC Q100 manufactured by TA Instruments Inc. according to JIS (Japanese Industrial Standards) K 7121, by a method comprising the steps of:

(1) melting about 10 mg of a sample at 200° C. in a nitrogen atmosphere;

(2) keeping at 200° C. for 5 minutes;

(3) cooling down to −90° C. at a rate of 10° C./minute; and (4) heating at a rate of 10° C./minute, thereby obtaining an endothermic curve, wherein a peak temperature appearing at 150 to 170° C. is assigned to Tm.

The above content (X) of the polymer component (2) contained in the propylene block copolymer, and the content of ethylene units contained in the polymer component (2) were measured according to a method comprising the steps of:

(1) dissolving homogeneously about 200 mg of a sample in 3 mL of o-dichlorobenzene using a 10 mm-Φ test tube;

(2) obtaining a $^{13}$C-NMR spectrum of the resultant solution under the following conditions,

| | |
|---|---|
| measurement temperature | 135° C., |
| pulse repetition time | 10 seconds, |
| pulse width | 45°, and |
| cumulated number | 2,500 times; and |

(3) obtaining the content (X) and the content of ethylene units, based on the $^{13}$C-NMR spectrum, according to descriptions in Macromolecules, 15, 1150-1152 (1982) by Kakugo, et al. The content of propylene units contained in the polymer component (2) was calculated from the formula, 100-X.

The above melt flow rate (MFR) was measured according to a method comprising the steps of:

(1) adding the following antioxidants to 100 parts by weight of a sample polymer, the antioxidants being 0.05 part by weight of calcium stearate manufactured by Kyodo Chemical Co., Ltd., 0.2 part by weight of 3,9-bis[2-(3-(3-tert-butyl-4-hydroxy-5-methylphenyl)propionyloxy)-1,1-dimethylethyl]-2,4,8,10-tetraoxaspiro [5.5]undecane (SUMILIZER GA80 manufacture by Sumitomo Chemical Co., Ltd.), and 0.2 part by weight of bis(2,4-di-tert-butyl-phenyl) pentaerythritol diphosphite (ULTRANOX 626 manufacture by GE Specialty Chemicals Inc.), thereby obtaining a blend;

(2) pelletizing the blend with a double screw kneading machine (KZW 15-45 NG manufactured by Technovel Corporation) having a inner diameter of 15 mm and a ratio of L/D of 45, at 190° C. at a screw rotation speed of 300 rpm, thereby obtaining pellets;

(3) injection-molding the pellets with an injection molding machine (Si-30 III manufactured by Toyo Machinery & Metal Co., Ltd.), at a molding temperature of 220° C. and at a mold cooling temperature of 50° C., thereby obtaining an injection-molded article; and (4) measuring a melt flow rate of the injection-molded article according to JIS-K-6758 at 230° C. under a load of 2.16 kg.

The above tensile strength was measured using the above-obtained injection-molded article, under the following conditions:
  measurement temperature: 23° C.,
  sample shape: dumbbell shaped small size specimen (2 mm-thickness) according to JIS No. 1, and
  tensile speed: 10 mm/minute.

The above flexural strength was measured using the above-obtained injection-molded article, under the following conditions:
  measurement temperature: 23° C.,
  sample shape: 12.7 mm×80 mm (4 mm-thickness),
  span: 64 mm, and
  tensile speed: 50 mm/minute.

The above IZOD impact strength was measured using the above-obtained injection-molded article, under the following conditions:
  measurement temperature: 23° C. or −30° C., and
  sample shape: 12.7 mm×65 mm (4 mm-thickness, V-notched).

The above volume-average particle diameter (Dv) was measure according to a method comprising the steps of:
  (1) cutting out a test piece (2 mm-thickness) for measurement of the above tensile strength, along its cross-section at −80° C. with a microtome knife;
  (2) dyeing at 60° C. for 90 minutes with a ruthenium acid vapor;
  (3) cutting at −50° C. with a diamond cutter, thereby making a 800 angstrom-thick ultrathin slice;
  (4) observing the ultrathin slice at 6,000-fold magnification with a transmission electron microscopy, type H-8000, manufactured by Hitachi, Ltd., wherein black color-dyed parts correspond to the polymer component (2);
  (5) photographing three different visual fields of the transmission electron microscopy;
  (6) introducing the above photographs into a computer with a scanner GT-9600 manufactured by Epson Corp. (100 dpi, 8 bit);
  (7) digitizing with a highly accurate image-editing software "A ZO-KUN" manufactured by Asahi Engineering. Co., Ltd., thereby obtaining an analysis area of 1,116 μm²;
  (8) obtaining a diameter of a circle (round shape) having the same area as that of the polymer component (2) (circle-corresponding particle diameter: Di, unit: μm), because dispersed particles corresponding to the polymer component (2) have an irregular shape; and
  (9) calculating the captioned volume-average particle diameter (Dv) according to the following formula, $$Dv = \sum_{i=1}^{n} Di^4 \Big/ \sum_{i=1}^{n} Di^3$$

wherein i is an integer of 1 to n; n is the number of particles; and Di is a circle-corresponding particle diameter of each particle.

Comparative Example 1

Example 1 was repeated except that (1) 11.5 mg of the solid catalyst component was changed to 11.6 mg thereof, (2) the transition metal compound and the ether group-containing linear hydrocarbon compound were not used, and (3) the polymerization time of 4 hours in the step (II) was changed to 1 hour, thereby obtaining a propylene block copolymer. Results are shown in Table 1.

The propylene block copolymer was mixed with a propylene homopolymer having an intrinsic viscosity, [η], of 1.02 dl/g and a CXS of 0.2% by weight, thereby obtaining a polymer mixture. The polymer mixture was found to contain a propylene-ethylene copolymer in an amount of 20% by weight, the total of the polymer mixture being 100% by weight, which amount (20% by weight) was close to the content (X: 17% by weight) of the polymer component (2) in Example 1. Evaluation results of the polymer mixture are shown in Tables 2 and 3.

Comparative Example 2

The propylene block copolymer obtained in Comparative Example 1 was also mixed with the propylene homopolymer used in Comparative Example 1, thereby obtaining a polymer mixture. The polymer mixture was found to contain a propylene-ethylene copolymer in an amount of 15% by weight, the total of the polymer mixture being 100% by weight, which amount (15% by weight) was also close to the content (X: 17% by weight) of the polymer component (2) in Example 1. Evaluation results of the polymer mixture are shown in Tables 2.

TABLE 1

|  | Example 1 | Comparative Example 1 |
|---|---|---|
| Polymer component (1) |  |  |
| [η]P (dl/g) | 0.97 | 1.04 |
| CXS (% by weight) | 0.7 | 0.7 |
| Polymer component (2) |  |  |
| Content (X) (% by weight) | 17 | 38 |
| Content of ethylene units (% by weight) | 42 | 41 |
| Content of propylene units (% by weight) | 58 | 59 |
| [η]EP (dl/g) | 5.81 | 4.00 |

TABLE 2

|  |  | Comparative Example | |
|---|---|---|---|
|  | Example 1 | 1 | 2 |
| MFR (g/10 minutes) | 18.4 | 21.6 | 29.6 |
| Tensile strength (MPa) | 26.3 | 18.0 | 16.7 |
| Flexural strength (MPa) | 944 | 917 | 1,100 |
| IZOD impact strength (kJ/m²) |  |  |  |
| at 23° C. | 17.8 | 15.3 | 8.3 |
| at −30° C. | 4.3 | 3.6 | 3.0 |

TABLE 3

|  | Example 1 | Comparative Example 1 |
|---|---|---|
| Dv (μm) | 0.29 | 0.55 |
| Number of particles (/μm²) | 1.55 | 0.67 |

Above experimental data show that a propylene block copolymer produced according to the process of the present invention is excellent in both its stiffness (tensile strength and flexural strength) and its impact resistance (Izod impact strength). The reason for an excellent impact resistance of the propylene block copolymer obtained in Example 1 is supposed to be that the polymer component (2) has a high intrinsic viscosity and has a small particle diameter (Dv).

Example 2

Step (I)

Using the same autoclave as that used in Example 1, Example 1 was repeated except that 11.5 mg of the solid catalyst component was changed to 12.9 mg thereof. The polymer component (1) was found to have an intrinsic viscosity ([η]P) of 1.01 dl/g, a melting temperature (Tm) of 162.7° C., and 0.7% by weight of a 20° C. xylene-soluble part (CXS), the total of the polymer component (1) being 100% by weight.

Addition of Compounds

Example 1 was repeated except that 0.22 mmol of 1,2-dimethoxyethane (ether group-containing linear hydrocarbon compound) was changed to 0.88 mmol of 1,2-diethoxybenzene (Lewis base compound).

Step (II)

A 24-liter inner volume cylinder connected to the above autoclave was evacuated. The cylinder was charged with 310 g of propylene and 160 g of ethylene, and then was heated up to 80° C., thereby preparing a mixed gas of propylene with ethylene, wherein the molar ratio of ethylene to propylene charged was 0.77.

The mixed gas in the cylinder was fed continuously to the above autoclave, thereby copolymerizing propylene with ethylene in the autoclave for one hour under a polymerization pressure of 0.8 MPa. After further 1.1 hour, all gases in the autoclave were purged, and the resultant polymer was dried at 60° C. for five hours under reduced pressure, thereby obtaining 273 g of polymer powder (propylene block copolymer), which corresponded to a polymerization activity of 21,200 g-propylene block copolymer/g-solid catalyst component.

The propylene block copolymer was found to have an intrinsic viscosity ([η]T) of 3.21 dl/g. The content (X) of the polymer component (2) (propylene-ethylene copolymer) in the propylene block copolymer was found to be 34% by weight, based on which an intrinsic viscosity ([η]EP) of the polymer component (2) was calculated to be 7.48 dl/g. The polymer component (2) was found to contain 49% by weight of ethylene units, the total of the polymer component (2) being 100% by weight, and to have a glass transition temperature (Tg) of −57.7° C. Results are shown in Tables 4 to 5.

The above glass transition temperature (Tg) was measured from the endothermic curve obtained in the above Tm measurement.

Comparative Example 3

Example 2 was repeated except that (1) 12.9 mg of the solid catalyst component was changed to 13.3 mg thereof, (2) zirconium (IV) isopropoxide (Zr(O-iPr)$_4$/transition metal compound) and 1,2-diethoxybenzene (Lewis base compound) were not used, and (3) the polymerization time of one hour in the step (II) was changed to 35 minutes. Results are shown in Tables 4 to 5.

Comparative Example 4

Example 2 was repeated except that (1) 12.9 mg of the solid catalyst component was changed to 7.3 mg thereof, (2) zirconium (IV) isopropoxide (Zr(O-iPr)$_4$/transition metal compound) was not used, and (3) the polymerization time of one hour in the step (II) was changed to 30 minutes. Results are shown in Tables 4 to 5.

Comparative Example 5

Example 2 was repeated except that (1) 12.9 mg of the solid catalyst component was changed to 10.6 mg thereof, and (2) zirconium (IV) isopropoxide (Zr(O-iPr)$_4$/transition metal compound) was changed to 0.15 mmol of ethyl aluminum dichloride ($C_2H_5AlCl_2$).

Example 3

Example 2 was repeated except that (1) 12.9 mg of the solid catalyst component was changed to 16.4 mg thereof, and (2) the polymerization time of one hour in the step (II) was changed to 2.8 hours. Results are shown in Tables 4 to 5.

Example 4

Example 2 was repeated except that (1) 12.9 mg of the solid catalyst component was changed to 12.0 mg thereof, (2) 0.15 mmol of zirconium (IV) isopropoxide (Zr (O-iPr)$_4$/transition metal compound) was changed to 0.49 mmol thereof, and (3) the polymerization time of one hour in the step (II) was changed to 45 minutes. Results are shown in Tables 4 to 5.

Example 5

Example 2 was repeated except that (1) 12.9 mg of the solid catalyst component was changed to 7.2 mg thereof, (2) 1,2-diethoxybenzene (Lewis base compound) was changed to 0.88 mmol of 2,6-lutidine, and (3) the polymerization time of one hour in the step (II) was changed to three hours. Results are shown in Tables 4 to 5.

Comparative Example 6

Example 5 was repeated except that (1) 7.2 mg of the solid catalyst component was changed to 9.9 mg thereof, (2) zirconium (IV) isopropoxide (Zr(O-iPr)$_4$/transition metal compound) was changed to 0.50 mmol of ethyl aluminum dichloride ($C_2H_5AlCl_2$), (3) the molar ratio of ethylene to propylene of 0.77 was changed to 0.57 by increasing the amount of ethylene in the cylinder, and (4) the polymerization time of 3 hours in the step (II) was changed to 5.5 hours. Results are shown in Tables 4 to 5.

Comparative Example 7

Example 5 was repeated except that (1) 7.2 mg of the solid catalyst component was changed to 9.0 mg thereof, (2) zirconium (IV) isopropoxide (Zr(O-iPr)$_4$/transition metal compound) was changed to 0.50 mmol of titanium (IV) n-butoxide (Ti(O-nBu)$_4$), (3) the molar ratio of ethylene to propylene of 0.77 was changed to 0.62 by increasing the amount of ethylene in the cylinder, and (4) the polymerization time of 3 hours in the step (II) was changed to 2 hours. Results are shown in Tables 4 to 5.

Comparative Example 8

Example 5 was repeated except that (1) 7.2 mg of the solid catalyst component was changed to 8.6 mg thereof, (2) zirconium (IV) isopropoxide (Zr(O-iPr)$_4$/transition metal compound) was changed to 0.49 mmol of polymethylaluminoxne (PMAO), and (3) the polymerization time of 3 hours in the step (II) was changed to 45 minutes. Results are shown in Tables 4 to 5.

Comparative Example 9

Example 5 was repeated except that (1) 7.2 mg of the solid catalyst component was changed to 8.6 mg thereof, (2) zirconium (IV) isopropoxide (Zr (O-iPr)$_4$/transition metal compound) was changed to 0.49 mmol of modified methylaluminoxne (MMAO), and (3) the polymerization time of 3 hours in the step (II) was changed to 45 minutes. Results are shown in Tables 4 to 5.

Above experimental data show the fact that although the propylene block copolymers obtained in Examples 2 to 5 were nearly equal to the propylene block copolymers obtained in Comparative Examples 3 to 9 in their melting temperature (Tm), the former block copolymers were higher enough than the latter block copolymer in their intrinsic viscosity ([η]EP), and also were lower enough in their glass transition temperature (Tg), which fact confirmed accordingly that a propylene block copolymer produced according to the process of the present invention is excellent in both its stiffness and its impact resistance.

The invention claimed is:

1. A process for producing a propylene block copolymer, comprising the steps of:

TABLE 4

|  | Example 2 | Comparative Example | | | Example | | | Comparative Example | | | |
| --- | --- | --- | --- | --- | --- | --- | --- | --- | --- | --- | --- |
|  |  | 3 | 4 | 5 | 3 | 4 | 5 | 6 | 7 | 8 | 9 |
| Transition metal compound (mmol) | | | | | | | | | | | |
| Zr(O-iPr)$_4$ | 0.15 | — | — | — | 0.15 | 0.49 | 0.49 | — | — | — | — |
| EtAlCl$_2$ | — | — | — | 0.15 | — | — | — | 0.50 | — | — | — |
| Ti(O-nBu)$_4$ | — | — | — | — | — | — | — | — | 0.50 | — | — |
| PMAO | — | — | — | — | — | — | — | — | — | 0.49 | — |
| MMAO | — | — | — | — | — | — | — | — | — | — | 0.49 |
| Lewis base compound (mmol) | | | | | | | | | | | |
| 1,2-diethoxybenzene | 0.88 | — | 0.88 | 0.88 | 0.88 | 0.88 | — | — | — | — | — |
| 2,6-lutidine | — | — | — | — | — | — | 0.88 | 0.88 | 0.88 | 0.88 | 0.88 |
| Polymerization activity (g/g) | 21200 | 21400 | 22200 | 20300 | 13900 | 12600 | 22400 | 19800 | 24400 | 22700 | 22700 |

TABLE 5

|  | Example 2 | Comparative Example | | | Example | | | Comparative Example | | | |
| --- | --- | --- | --- | --- | --- | --- | --- | --- | --- | --- | --- |
|  |  | 3 | 4 | 5 | 3 | 4 | 5 | 6 | 7 | 8 | 9 |
| Polymer component (1) | | | | | | | | | | | |
| [η]P (dl/g) | 1.01 | 1.04 | 1.09 | 0.94 | 0.99 | 0.98 | 1.09 | 1.00 | 1.06 | 0.97 | 0.99 |
| Tm (° C.) | 162.7 | 162.3 | 162.8 | 161.8 | 160.6 | 161.6 | 162.1 | 161.9 | 162.8 | 162.8 | 161.7 |
| CXS (% by weight) | 0.7 | 0.7 | 0.8 | 0.6 | 0.9 | 0.8 | 0.6 | 0.7 | 0.6 | 0.7 | 0.7 |
| Polymer component (2) | | | | | | | | | | | |
| Content X (% by weight) | 34 | 38 | 26 | 26 | 56 | 43 | 18 | 25 | 20 | 25 | 25 |
| C$_2$' unit content (% by weight) | 49 | 41 | 58 | 54 | 42 | 54 | 63 | 50 | 44 | 52 | 50 |
| C$_3$' unit content (% by weight) | 51 | 59 | 42 | 46 | 58 | 46 | 37 | 50 | 56 | 48 | 50 |
| [η]EP (dl/g) | 7.48 | 4.00 | 4.59 | 4.44 | 7.71 | 10.58 | 9.50 | 2.99 | 12.69 | 3.74 | 4.10 |
| Tg (° C.) | −57.7 | −43.0 | −52.0 | −57.7 | −51.1 | −54.8 | −53.8 | −53.7 | −36.5 | −50.1 | −47.7 |

It is supposed that a propylene block copolymer produced according to the process of the present invention depends mainly:

on the melting temperature (Tm) of the polymer component (1) in its stiffness;

on the intrinsic viscosity ([η]EP) of the polymer component (2) in its impact resistance; and on the glass transition temperature (Tg) of the polymer component (2) in its low temperature impact resistance;

and, the higher the melting temperature (Tm) is, the higher the stiffness is; the higher the intrinsic viscosity ([η]EP) is, the higher the impact resistance is; and the lower the glass transition temperature (Tg) is, the higher the low temperature impact resistance is.

(I) homopolymerizing propylene or copolymerizing propylene with an olefin other than propylene, in the presence of a catalyst formed by contacting with one another a solid catalyst component containing titanium atoms, magnesium atoms and halogen atoms, an organoaluminum compound and an external electron donor compound, thereby forming a polymer component (1) containing 90% by weight or more of propylene units, the total of the polymer component (1) being 100% by weight; and (II) copolymerizing propylene with an olefin other than propylene in the presence of the polymer component (1), thereby forming a polymer component (2) containing 10 to 90% by weight of propylene units, the total of the polymer component (2) being 100% by weight;

a combination of a transition metal compound represented by the following formula (ii) with an ether group-containing linear hydrocarbon compound and/or a Lewis base compound being added to the above polymerization system between the ending point of the step (I) and the starting point of the step (II), or during the step (II),

wherein M is a zirconium atom or a hafnium atom; $R^1$ is a hydrocarbon group; X is a hydrogen atom, a halogen atom or a hydrocarbon group; p is a number satisfying $0 \leq p \leq m$; q is a number satisfying $0 \leq q \leq m$; p+q=m; and m is the valence of M.

2. The process for producing a propylene block copolymer according to claim 1, wherein the combination of a transition metal compound represented by the formula (ii) with an ether group-containing linear hydrocarbon compound and/or a Lewis base compound is added in this order to the polymerization system between the ending point of the step (I) and the starting point of the step (II).

3. The process for producing a propylene block copolymer according to claim 1, wherein the transition metal compound represented by the formula (ii) is a compound represented by the formula $Zr(OR^1)_4$ or $Hf(OR^1)_4$, wherein $R^1$ is a hydrocarbon group.

4. The process for producing a propylene block copolymer according to claim 1, wherein the solid catalyst component containing titanium atoms, magnesium atoms and halogen atoms is produced according to a process comprising the steps of:
(1) reducing a titanium compound represented by the following formula (i) with an organomagnesium compound in the presence of an organosilicon compound containing a Si—O bond, thereby forming a solid component containing trivalent titanium atoms; and
(2) contacting the solid component, a halogenating compound and an internal electron donor compound with one another;

wherein R is a hydrocarbon group having 1 to 20 carbon atoms; X is independently of one another a halogen atom or a hydrocarbyloxy group having 1 to 20 carbon atoms; and a is a number of 1 to 20.

5. The process for producing a propylene block copolymer according to claim 1, wherein the Lewis base compound is a nitrogen atom-containing heterocyclic compound or an alkoxy group-containing aromatic compound.

* * * * *